United States Patent
Boisselle et al.

(10) Patent No.: US 8,925,352 B2
(45) Date of Patent: *Jan. 6, 2015

(54) METHOD OF SHAPING GLASS SHEETS

(75) Inventors: Robert J. Boisselle, Maumee, OH (US); Daniel P. Lubelski, Rossford, OH (US)

(73) Assignee: Pilkington Group Limited, St. Helens (GB)

( * ) Notice: Subject to any disclaimer, the term of this patent is extended or adjusted under 35 U.S.C. 154(b) by 9 days.

This patent is subject to a terminal disclaimer.

(21) Appl. No.: 13/358,665

(22) Filed: Jan. 26, 2012

(65) Prior Publication Data

US 2012/0198890 A1    Aug. 9, 2012

Related U.S. Application Data

(60) Provisional application No. 61/439,447, filed on Feb. 4, 2011.

(51) Int. Cl.
*C03B 23/033* (2006.01)
*C03B 35/16* (2006.01)

(52) U.S. Cl.
CPC ............ *C03B 23/033* (2013.01); *C03B 35/163* (2013.01)
USPC ................. 65/106; 65/289; 65/253; 65/370.1

(58) Field of Classification Search
CPC   C03B 23/023; C03B 23/004; C03B 23/0357; C03B 23/033; C03B 35/161; C03B 23/0254; C03B 35/187
USPC ..................................... 65/106, 63, 102, 104
See application file for complete search history.

(56) References Cited

U.S. PATENT DOCUMENTS

| | | | |
|---|---|---|---|
| 3,545,951 A | 12/1970 | Nedelec | |
| 3,701,644 A * | 10/1972 | Frank | 5/106 |
| 3,831,239 A | 8/1974 | Hoff et al. | |
| 4,054,437 A | 10/1977 | Ueberwolf et al. | |
| 4,054,438 A | 10/1977 | Presta | |
| 4,123,246 A | 10/1978 | Johnson | |
| 4,292,065 A | 9/1981 | Nedelec et al. | |
| 4,305,746 A * | 12/1981 | Hagedorn et al. | 65/106 |
| 4,820,327 A | 4/1989 | Letemps et al. | |
| 5,286,271 A * | 2/1994 | Rueter et al. | 65/106 |
| 2005/0061032 A1 * | 3/2005 | Yoshizawa | 65/106 |
| 2011/0277509 A1 * | 11/2011 | Boisselle et al. | 65/106 |

* cited by examiner

*Primary Examiner* — Jodi C Franklin
(74) *Attorney, Agent, or Firm* — Marshall & Melhorn, LLC

(57) ABSTRACT

The present invention relates to a method of shaping a glass sheet in one dimension, by roll forming in a manner to selectively minimize/eliminate undesired curvature from the glass sheet. Such shaping is achieved by the selective location in first and second, shaping zones, of shaping rolls having first and second shaping configurations and, optionally, by varying the velocity of the glass sheet as it moves through the shaping zones, thus varying the time portions of the glass sheet are in contact with certain shaping rolls.

12 Claims, 2 Drawing Sheets

METHOD OF SHAPING GLASS SHEETS

BACKGROUND OF THE INVENTION

The present invention relates to a method of shaping glass sheets. More specifically, the present invention relates to a method of shaping glass sheets by roll forming such that undesired curvature may be selectively minimized/eliminated from desired portions of the glass sheet.

In a roll forming operation, glass sheets suitable for use as, for example, vehicle windows are conventionally heated to temperature suitable for shaping and are conveyed by a conveying system into a first roll shaping zone, where they are conveyed between upper and lower sets of rotating shaping rolls having a first shaping configuration. Each set of upper and lower shaping rolls have complementary shapes so as to allow a glass sheet to pass therebetween, and to take the cumulative shape of the entire set of upper and lower shaping rolls, while still being susceptible to further alterations in shape. In general, shaping in the first roll shaping zone is preferably transverse to the direction of travel of the glass sheet.

It is advantageous to transport the heated glass sheets through the roll shaping zone at as high a velocity as practicable to reduce cycle time, and to maintain the glass sheet at a temperature sufficient to allow additional shaping in, for example, an inclined second roll shaping zone. Such additional glass shaping is preferably accomplished by the glass sheet being transported from the horizontal first roll shaping zone, up the slope of the inclined second roll shaping zone.

Bending a heated glass sheet by roll forming is known in the patent literature. Examples include:

U.S. Pat. No. 3,545,951 describes a plurality of arcuately curved rods mounted for rotation each about its own chordal axis. The axes are said to be coplanar, parallel and spaced, and the rods are said to be interconnected for pivoting in unison each about its own axis, from a first position, wherein they are said to be coplanar in a common plane through all axes, to a second position wherein they are said to conjointly define a curved surface whose curvature is variable in dependence upon the angle of rotation of the rods. Sheets said to be in bendable form are moved onto the rods in the first position. The rods are then pivoted to the second position and shaping means complementary to the curved surface defined by the rods are pressed down onto the sheet to conform it to the rods, while the sheet moves continuously, and after shaping, passes to a cooling and tempering chamber or other processing procedure.

U.S. Pat. No. 3,831,239 describes an improved form of corrugated tube intended to facilitate the rotation of the corrugated tubes about curves rods. The inside diameter of the flexible tube is made larger than the diameter of the current rod. A plurality of rings is disposed on the inside of the tube, each ring being located between two adjacent corrugations, the rings being at suitable intervals along the length of the tube. These rings rotate with the tube around the rod. Due to the presence of the rings (sometimes referred to as bearing rings), the flexible tube does not come into contact with the curved rod. The portions of the tube suspended between adjacent bearing rings are capable of sustaining sufficient stress from the sheets without collapsing onto the rod, and are thus capable, in combination with the rods, of imposing the desired shape on the glass sheets.

U.S. Pat. No. 4,054,437 describes a sheet to be curved, such as glass at a softening temperature, being advanced on a fixed curved bed formed by a series of curved rods having different angles of inclination to form an ascending convex bed with an increasing curvature profile. The sheet is thus gradually raised and simultaneously curved by sagging of the edges thereof. The curved rods are said to have aligned end sections mounted in the same horizontal plane and the inclinations progressively increase. The bed is followed by a bed of constant curvature profile formed by curved rods having the same inclination. Means are said to be provided for independently adjusting the inclination of each rod. Particular ranges of spacing and rate of advance are said to be given.

U.S. Pat. No. 4,054,438 describes a roll forming system similar to U.S. Pat. No. 4,054,437, except that the assemblage of rods are fixed in orientations throughout the roll forming cycle, thus not requiring the mechanical and electrical equipment necessary to raise and lower the assemblage of rods during each bending cycle. Also, if the orientation of the rods is altered to make a different part, the roller and beam system of the invention allows the rods to be repositioned as a unit, rather than individually.

U.S. Pat. No. 4,123,246 describes shaped solid members such as successive rotating shaping rolls of predetermined contour of a uniform cylindrical or curved configuration which engage a heat-softened glass sheet along an arcuate longitudinal path of substantially constant radius of curvature along forming and quenching conveyors to impart a desired longitudinal component of curvature to the glass and to convey the shaped glass past cool blasts that harden the glass surfaces. The arcuate path is said to be arranged in such a manner that its upward slope at its downstream end is said to be limited to one at which glass sheets move forward toward the cooling conveyor without slipping. A set of at least three special quench rolls forms an upwardly sloped transition conveyor section of constant maximum slope that replaces the downstream portion of the arcuate path where the upward slope would increase to a slope where slippage would take place. The special transition quench rolls are located downstream of the location where blasts of tempering fluid applied at the quenching section have hardened the major glass sheet surfaces sufficiently to, desirably, avoid their distortion by engagement with the rotating special transition quench rolls.

U.S. Pat. No. 4,292,065 describes a method and apparatus for bending sheets in the plastic state, such as sheets of glass at their softening temperature in two directions. The apparatus comprises a first bed of arcuate rods which can be positioned to impart a transverse curvature to the sheet and a second bed of arcuate rods which can be positioned to impart a longitudinal curvature to the sheet. Advantageously, the bending is performed in a heated enclosure at a temperature at least equal to that at which the sheet is later tempered.

U.S. Pat. No. 4,820,327 describes bending a heated glass plate by moving it over a bed of rollers defining a path curved along the direction of movement of the glass plate so as to define an upwardly facing concavity. The glass plate moves with a speed of at least 10 cm/sec and is curved by the bed without contact from above. The glass plate is subsequently tempered.

SUMMARY OF THE INVENTION

The present invention relates to a method of shaping glass sheets. More specifically, the present invention relates to a method of shaping glass sheets by roll forming, such that undesired curvature may be selectively minimized/eliminated from desired portions of the glass sheet.

The present invention utilizes a glass shaping system typically having as major components: a glass heating furnace, followed by a substantially horizontal first roll shaping zone, followed by a second roll shaping zone inclined upward at a predetermined angle or slope relative to the substantially horizontal first shaping zone.

The glass shaping system may include one or more pairs of upper and lower shaping rolls having a first substantially transversely straight shaping configuration, and at one or more selected locations in the first roll shaping zone, one or more pairs of upper and lower shaping rolls having a second transversely convexly arcuately curved configuration.

As previously indicated, it is generally desirable to transport the glass sheet through the horizontal first roll shaping zone at as high a velocity as practicable, however, it may be desirable to vary the velocity at which the heated glass sheet is traveling through the first roll shaping zone to selectively influence the roll shaping which occurs. For example, it may be beneficial to reduce the speed of the shaping rolls so that some portions of the glass sheet are in contact with, for example, the shaping rolls having the transversely convexly arcuately curved configuration, for a longer time, thus creating a shape somewhat different than if the glass sheet is travelling at a higher velocity with a shorter contact time with the shaping rolls having the transversely convexly arcuately curved configuration. By the placement of the shaping rolls having the transversely convexly arcuately curved configuration and optionally reducing the speed of the shaping rolls, and thus the velocity of the glass sheet, undesired curvature may be selectively minimized/eliminated from desired portions of the glass sheet.

BRIEF DESCRIPTION OF THE DRAWINGS

The above, as well as other advantages of the present invention, will become readily apparent to those skilled in the art from the following detailed description when considered in light of the accompanying drawings in which.

DETAILED DESCRIPTION OF THE PREFERRED EMBODIMENTS

The present invention relates to a method of shaping glass sheets, and more specifically, shaping a heated glass sheet by roll forming, such that undesired curvature may be selectively minimized/eliminated from desired portions of the glass sheet. For example, the undesired curvature may be removed from the trailing edge of the glass sheet.

This result is achieved generally by utilizing a glass shaping system which typically has at least (1) a glass heating furnace for heating glass sheets 10 to a temperature sufficient to enable the glass sheets 10 to be shaped, (2) a substantially horizontal first roll shaping zone 16, and (3) a second roll shaping zone 18 which is configured to be upwardly inclined at a predetermined angle or slope relative to the first roll shaping zone 16. (See FIG. 1.)

Figure 2:
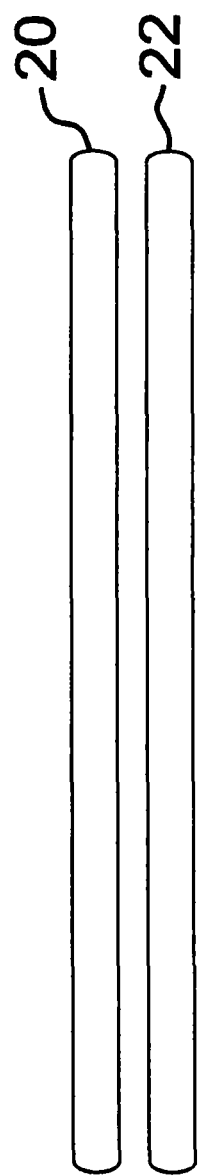
FIG. 2 is a profile view of shaping rolls having a first substantially transversely straight configuration in accordance with the invention.
Figure 3:
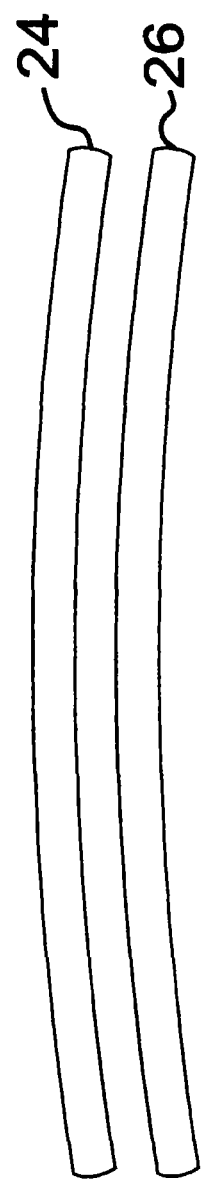
FIG. 3 shows a profile view of shaping rolls having a transversely convexly arcuately curved shaping configuration in accordance with the invention.

More particularly, within the first horizontal shaping zone 16, the shaping system of the invention utilizes one or more pairs of upper and lower shaping rolls 20, 22 having a first substantially transversely straight configuration and, at one or more selected locations within the first shaping zone, one or more pairs of upper and lower shaping rolls 24, 26 having a second transversely convexly arcuately curved configuration, as shown in FIGS. 2 and 3.

In addition to the configuration of the shaping rolls, the inventors have found, generally, that the shape of a selected portion of the glass sheet 10 to be shaped may be further altered by varying the contact time t between one or more portions of the glass sheet 10 with the selectively configured shaping rolls of the present system 20, 22, 24, 26. The contact time between the glass sheet 10 and a given set of shaping rolls is influenced by the rotational speed of the shaping rolls, which in turn influences the velocity of the glass sheet 10 as it is transported between the various sets of shaping rolls 20, 22, 24, 26. The present system is controlled by conventional mechanical and electrical means to allow for variations in the rotational speed of any of the shaping rolls, but preferably the rotational speed of the shaping rolls 24, 26 having the transversely convexly arcuately curved configuration can be varied so as to cause the glass sheet being transported therebetween to vary between, for example, velocity $V_1$ and velocity $V_2$, which velocity $V_2$ is less than velocity $V_1$. Velocity $V_1$ may preferably be between 0.3 m/sec. and 1.0 m/sec., while velocity $V_2$ may preferably be between 0.05 m/sec. and 0.3 m/sec. Increases and decreases in the velocity of the glass sheet 10 may be triggered by either the leading edge of the glass sheet 12, or the trailing edge of the glass sheet 14. It is also possible, and when bending thicker glass may be desirable, to operate the system of the invention where $V_1$ is equal to $V_2$.

A decrease in velocity of the glass sheet 10, as previously noted, desirably translates into an increase in, for example, the contact time t between the leading edge of the glass sheet 12 and/or the trailing edge of the glass sheet 14 and shaping rolls 24, 26, preferably having the second convexly arcuately curved configuration. Such contact time t at velocity $V_2$ may be on the order of 1.5 sec. to 3.0 sec., whereas contact time t with the shaping rolls when glass sheet 10 is traveling at higher velocity $V_1$ is on the order of 0.5 sec. to 1.5 sec. Such modest increase in contact time t can, the inventors have found, cause significant changes in glass shape while having little adverse effect on the overall cycle time for shaping a given glass sheet. The present system also provides significant flexibility in the number of different vehicle windows which can be formed on the system without making major changes to the primary components thereof.

Figure 1:
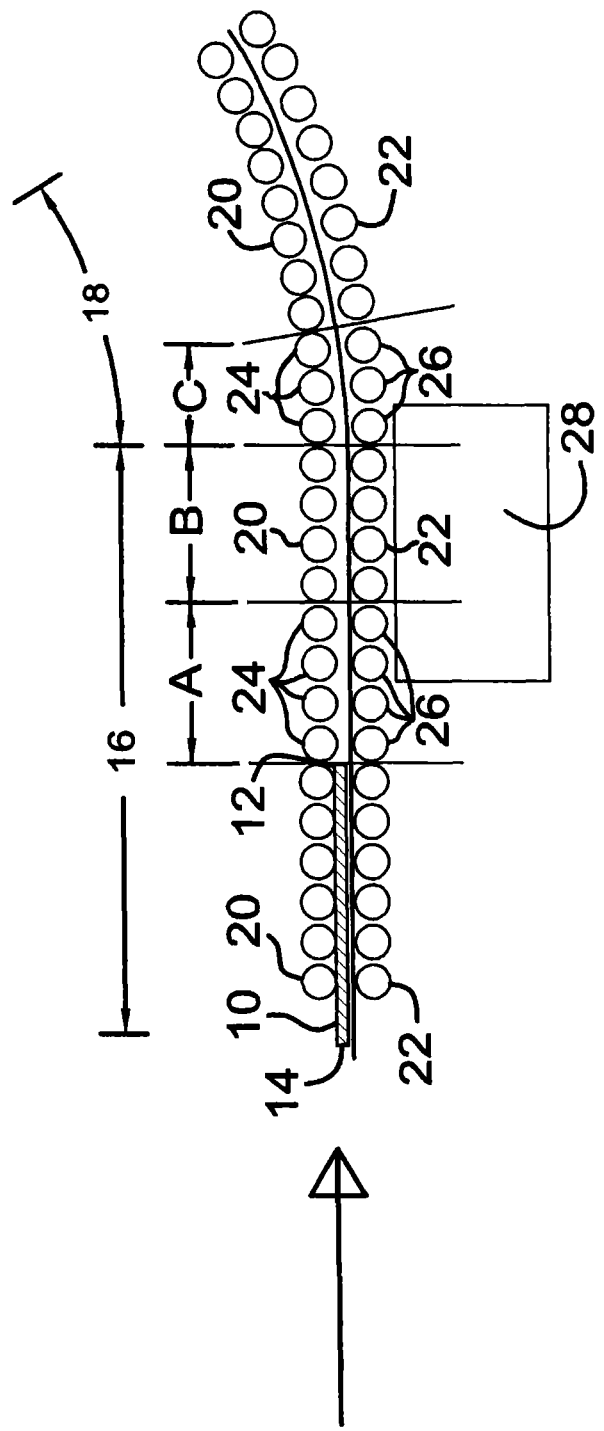
FIG. 1 is a sectional view of the roll forming system of the present invention.

To more clearly describe the invention, it is useful to conceptually divide the first shaping zone into sub-zones, here called sub-zones A, B and C, as illustrated in FIG. 1. As would be appreciated by those skilled in the art of roll forming, to achieve the aforementioned objectives of the invention, various combinations of shaping rolls 20, 22 having the first substantially transversely straight configuration and those 24, 26 having the second transversely convexly arcuately curved configuration may be utilized. For example, sub-zone A of the first shaping zone 16 may include shaping rolls 24, 26 having the transversely convexly arcuately curved shaping configuration while sub-zones B and C may include shaping rolls 20, 22 having the first substantially transversely straight configuration. Alternatively, it may be useful to place shaping rolls 24, 26 having the second transversely convexly arcuately curved configuration in sub-zone C, while the shaping rolls 20, 22 in sub-zones A and B have the first substantially transversely straight configuration. In yet another alternative, sub-zones A and C may contain shaping rolls 24, 26 having the second transversely convexly arcuately curved configuration, while sub-zone B may contain shaping rolls 20, 22 having the first substantially transversely straight configuration. Of course, other combinations of shaping roll configurations may be possible and are within the scope of the invention.

The shaping rolls 20, 22, 24, 26 may be made from any suitable material; however, a metal material is preferred. The shaping rolls may be solid or tubular; i.e., having some open space within an outer wall of the roll. Steel is especially preferred. Coverings for various purposes may be used to cover the outer surface of the shaping rolls, e.g., thermally resistant and abrasion resistant materials such as fiberglass, stainless steel mesh and the like.

As previously mentioned, the second shaping zone 18 is preferably upwardly inclined at a predetermined angle or slope relative to the first substantially horizontal shaping zone 16. With such an arrangement, the glass sheet 10 can, in one operation, be bent in a plane substantially transverse to its direction of movement, and in a plane substantially longitudinal to its direction of movement. In the present invention, however, curvature in the transverse direction is desirably minimized/eliminated and the curvature to a predetermined radius is desirably limited to the longitudinal direction as effectuated by the inclined second shaping zone.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of shaping glass sheets comprising:
   providing a glass sheet having a leading edge and a trailing edge, heated to a predetermined temperature so as to be shapeable;
   conveying the glass sheet through a horizontal first shaping zone for transversely shaping the glass sheet, the first shaping zone comprising upper and lower sets of rotating shaping rolls, a first set of one or more pairs of upper and lower shaping rolls each having a first substantially transversely straight configuration and a second set of one or more pairs of upper and lower shaping rolls each having a transversely convexly arcuately curved configuration, the lower transversely convexly arcuately curved shaping roll of each of the one or more pairs of shaping rolls having a convex surface contacting the glass sheet and the upper transversely convexly arcuately curved shaping roll of the respective pair of shaping rolls having a concave surface contacting the glass sheet;
   the heated glass sheet being conveyed by the rotating shaping rolls at a predetermined velocity into the first shaping zone, the leading edge or the trailing edge of the glass sheet to be shaped contacting the one or more pairs of the upper and lower shaping rolls selectively having the transversely convexly arcuately curved configuration, or the substantially transversely straight configuration, wherein the leading edge and the trailing edge are substantially transversely flat; and
   conveying the glass sheet to enter a proximate second shaping zone upwardly inclined at a predetermined angle or slope relative to the first horizontal shaping zone.

2. The method of shaping glass sheets defined in claim 1, wherein the horizontal first shaping zone is divided into sub-zones A, B and C, and shaping rolls having the transversely convexly arcuately curved configuration are located in sub-zone A, and shaping rolls having the substantially transversely straight configuration are located in sub-zones B and C.

3. The method of shaping glass sheets defined in claim 1, wherein the horizontal first shaping zone is divided into sub-zones A, B and C and shaping rolls having the transversely convexly arcuately curved configuration are located in sub-zone C, and shaping rolls having the substantially transversely straight configuration are located in sub-zones A and B.

4. The method of shaping glass sheets defined in claim 1, wherein the horizontal first shaping zone is divided into sub-zones A, B and C and shaping rolls having the transversely convexly arcuately curved configuration are located in sub-zones A and C, and shaping rolls having the substantially transversely straight configuration are located in sub-zone B.

5. The method of shaping glass sheets defined in claim 1, wherein the shaping rolls are comprised of metal.

6. The method of shaping glass sheets defined in claim 5, wherein the shaping rolls are comprised of solid metal.

7. The method of shaping glass sheets defined in claim 6, wherein the shaping rolls are comprised of solid steel.

8. The method of shaping glass sheets defined in claim 5, wherein the metal shaping rolls are covered with a thermally resistant material.

9. The method of shaping glass sheets defined in claim 5, wherein the metal shaping rolls are covered with an abrasion-resistant material.

10. A method of shaping glass sheets comprising:
    providing a glass sheet having a leading edge and a trailing edge, heated to a predetermined temperature so as to be shapeable;
    conveying the glass sheet through a horizontal first shaping zone for transversely shaping the glass sheet, the first shaping zone comprising upper and lower sets of rotating shaping rolls, a first set of one or more pairs of upper and lower shaping rolls each having a first substantially transversely straight configuration and a second set of one or more pairs of upper and lower shaping rolls each having a transversely convexly arcuately curved configuration, the lower transversely convexly arcuately curved shaping roll of each of the one or more pairs of shaping rolls having a convex surface contacting the glass sheet and the upper transversely convexly arcuately curved shaping roll of the respective pair of shaping rolls having a concave surface contacting the glass sheet;
    conveying the glass sheet by the rotating shaping rolls at a velocity between 0.3 m/sec and 1.0 m/sec into the first horizontal shaping zone, upon the leading edge or the trailing edge of the glass sheet to be shaped contacting the one or more pairs of upper and lower shaping rolls selectively having the transversely convexly arcuately curved configuration, reducing the speed of the glass sheet to between 0.05 m/sec and 0.3 m/sec for a time between 1.5 sec and 3.0 sec, wherein the leading edge and the trailing edge of the glass sheet are substantially transversely flat; and
    conveying the glass sheet to enter a second shaping zone upwardly inclined at a predetermined angle or slope relative to the horizontal first shaping zone.

11. A method of shaping glass sheets comprising:
    providing a glass sheet having a leading edge and a trailing edge, heated to a predetermined temperature so as to be shapeable;
    conveying the glass sheet through a horizontal first shaping zone for transversely shaping the glass sheet, the first shaping zone comprising upper and lower sets of rotating shaping rolls, a first set of one or more pairs of upper and lower shaping rolls each having a first substantially transversely straight configuration and a second set of one or more pairs of upper and lower shaping rolls each having a transversely convexly arcuately curved configuration, the lower transversely convexly arcuately curved shaping roll of each of the one or more pairs of shaping rolls having a convex surface contacting the glass sheet and the upper transversely convexly arcuately curved shaping roll of the respective pair of shaping rolls having a concave surface contacting the glass sheet, the heated glass sheet being conveyed by the rotating shaping rolls at a predetermined velocity into the first shaping zone, the leading edge or the trailing edge of the glass sheet to be shaped contacting the second set of one or more pairs of upper and lower shaping rolls each having a transversely convexly arcuately curved configuration and thereafter contacting the first set of one or more pairs of upper and lower shaping rolls each having a first substantially transversely straight configuration; and conveying the glass sheet to enter a proximate second shaping zone upwardly inclined at a predetermined angle or slope relative to the first horizontal shaping zone.

12. The method of shaping glass sheets defined in claim 11, wherein the horizontal first shaping zone further comprises a third set of one or more pairs of upper and lower shaping rolls each having a first substantially transversely straight configuration, and the glass sheet contacts the third set before contacting the second set of one or more pairs of upper and lower shaping rolls.

* * * * *